(12) United States Patent
Factor et al.

(10) Patent No.: US 9,109,862 B2
(45) Date of Patent: Aug. 18, 2015

(54) SYSTEM, DEVICE, AND METHOD OF PROTECTING AIRCRAFTS AGAINST INCOMING THREATS

(71) Applicants: Ronen Factor, Ramat Gan (IL); David Dragucki, Herzeliya (IL); Ariye Yehuda Caplan, Haifa (IL); Zahi Ben Ari, Haniel (IL); Semion Zelikman, Rishon Lezion (IL); Royee Li-Ran, Herzliya (IL)

(72) Inventors: Ronen Factor, Ramat Gan (IL); David Dragucki, Herzeliya (IL); Ariye Yehuda Caplan, Haifa (IL); Zahi Ben Ari, Haniel (IL); Semion Zelikman, Rishon Lezion (IL); Royee Li-Ran, Herzliya (IL)

(73) Assignee: BIRD Aerosystems Limited, Herzelia (IL)

( * ) Notice: Subject to any disclaimer, the term of this patent is extended or adjusted under 35 U.S.C. 154(b) by 0 days.

(21) Appl. No.: 14/156,490

(22) Filed: Jan. 16, 2014

(65) Prior Publication Data

US 2014/0209678 A1 Jul. 31, 2014

Related U.S. Application Data

(63) Continuation-in-part of application No. 13/432,029, filed on Mar. 28, 2012, now Pat. No. 8,672,223.

(30) Foreign Application Priority Data

May 24, 2011 (IL) .......................... 213125
Jun. 6, 2013 (IL) .......................... 226817

(51) Int. Cl.
*G06F 19/00* (2011.01)
*F41H 11/02* (2006.01)
*F41H 13/00* (2006.01)
*G01S 7/495* (2006.01)
*G01S 7/38* (2006.01)
*G01S 13/86* (2006.01)

(52) U.S. Cl.
CPC .............. *F41H 11/02* (2013.01); *F41H 13/005* (2013.01); *G01S 7/38* (2013.01); *G01S 7/495* (2013.01); *G01S 13/867* (2013.01)

(58) Field of Classification Search
USPC .......................... 235/400; 342/53, 54, 13, 14
See application file for complete search history.

(56) References Cited

U.S. PATENT DOCUMENTS

| | | | |
|---|---|---|---|
| 5,662,291 A | 9/1997 | Sepp et al. | |
| 6,707,052 B1 | 3/2004 | Wild et al. | |
| 6,771,205 B1 | 8/2004 | Barton et al. | |
| 2005/0275582 A1* | 12/2005 | Mohan ........................... | 342/13 |
| 2006/0065774 A1 | 3/2006 | Roques et al. | |
| 2007/0052806 A1 | 3/2007 | Bnayahu et al. | |

(Continued)

OTHER PUBLICATIONS

European Search report for EP 12162267 dated Aug. 28, 2012.

*Primary Examiner* — Ahshik Kim
(74) *Attorney, Agent, or Firm* — Eitan, Mehulal & Sadot

(57) ABSTRACT

System, device and method for protecting aircrafts against incoming threats. The system includes: (a) a dual-band Radio Frequency (RF) track-and-confirm module comprising: a dual-band RF receiver to receive high-band RF signals and low-band RF signals; a threat confirmation module to confirm a possible incoming threat based on processing of RF signals received at the dual-band RF receiver; a threat parameters calculator to calculate a fine angular position and a precise angular position of a confirmed incoming threat, based on processing of RF signals received at low-band RF for fine angular position and at high-band RF for precise angular position; (b) a countermeasure directed Laser module to activate a directed Laser countermeasure towards said precise angular position of said confirmed incoming threat.

26 Claims, 7 Drawing Sheets

(56) References Cited

U.S. PATENT DOCUMENTS

| | | |
|---|---|---|
| 2007/0075182 A1 | 4/2007 | Fetterly |
| 2007/0201015 A1 | 8/2007 | Gidseg et al. |
| 2007/0255672 A1 | 11/2007 | Olsson |
| 2009/0224958 A1 | 9/2009 | Aphek et al. |
| 2010/0253567 A1 | 10/2010 | Factor et al. |
| 2011/0069145 A1* | 3/2011 | Weber et al. ............ 348/36 |

* cited by examiner

SYSTEM, DEVICE, AND METHOD OF PROTECTING AIRCRAFTS AGAINST INCOMING THREATS

CROSS-REFERENCE TO RELATED APPLICATIONS

This patent application claims priority and benefit from Israeli patent application number IL 226817, which was filed in the Israeli Patent Office on Jun. 6, 2013, and which is hereby incorporated by reference in its entirety.

This patent application is a Continuation-in-Part (CIP) of U.S. patent application Ser. No. 13/432,029, filed on Mar. 28, 2012, which is hereby incorporated by reference in its entirety; and which claimed priority and benefit from Israeli patent application number IL 213125, which was filed in the Israeli Patent Office on May 24, 2011, and which is hereby incorporated by reference in its entirety.

FIELD

The present invention is related to the field of protecting aircrafts against incoming threats.

BACKGROUND

Military and civilian aircrafts, including fixed-wing aircrafts and rotary-wing aircrafts, may be exposed to threats by hostile forces, for example, terrorists or military forces. In the past three decades, numerous aircrafts have been attacked or hit by Infra-Red (IR) guided missiles, for example, man-portable shoulder-fired IR guided missiles or other man-portable air-defense (MANPAD) units.

Some aircrafts may be equipped with a Wide-body Integrated Platform Protection System (WIPPS), for example, a WIPPS Infra-Red Counter Measures (IRCM) suite. Such systems include, for example, imaging Ultra-Violet (UV) or Infra-Red (IR) electro-optic Missile Warning Sensors (MWS) and a pulse-Doppler radar MWS, for sensing (i.e., detecting and tracking) incoming threats.

Unfortunately, utilization of two different multi-sensor sub-systems renders the system heavy and prohibitively expensive, particularly for smaller aircraft.

SUMMARY

The present invention may include, for example, systems, devices, and methods for protecting aircrafts against incoming threats.

The present invention may use dual-stage Radio Frequency (RF) tracking, for example, by utilizing a Missile Approach Confirmation Sensor with DIRCM (MACS-D) unit operating at two different RF bands (e.g., a low band and a high band), with integral Directed Infra-Red Counter Measures (DIRCM). The system may be implemented with a Low-Band Active Missile Warning System (MWS) that provides an alarm or pre-alarm to a central computer. Accordingly, the system may comprise MACS-D unit(s), and integral Low-Band MWS unit(s); and the system may be referred to herein as "MACS-D-LB".

The MACS-D-LB system may perform the following operations: verify that a threat exists (e.g., verify that the suspected threat is not a false alarm); measure or estimate the threat characteristics (e.g., distance of the threat from the aircraft, velocity of the incoming threat, or the like); track the threat (e.g., by two stages, first Low-Band and then Ka-Band RF tracking); point an integral (e.g., Laser) IR counter-measure accurately on the threat or towards the threat; counter the incoming threat by means of the IR counter-measure (e.g., Jamming).

The present invention may allow integration with a Low-Band based Missile Warning System (MWS), which is typically an active system (e.g., a MWS system that emits RF signals in the Low-Band), and which may generate warnings about incoming threats but may typically have a very low directional accuracy (e.g., in the range of tens of degrees). In accordance with the present invention, by utilizing a specific antenna design on the MACS-D-LB system, as well as dedicated RF signal processing, the MACS-D-LB system may perform the following: an active Low-Band MWS performs detection (by using Low-Band signals); the active pulse Doppler MWS declares the threat, or provides pre-alarm of the threat; the active pulse Doppler MWS provides threat-related data (e.g., antenna, antenna sector, real-time radar parameters) to the central computer via an interface; the MACS-D-LB system receives, by passive reception of the active pulse Doppler MWS transmission in Low-Band, the threat data and rotates to the center of the sector; importantly, the MACS-D-LB then receives in Low-Band the MWS signal return; the MACS-D-LB system performs confirmation and tracking of the threat in Low-Band, down to an accuracy of approximately one degree; the MACS-D-LB system rotates towards the tracked incoming threat; the MACS-D-LB system performs confirmation and tracking of the incoming threat in Ka-Band, with accuracy of under 1 degree; and the MACS-D-LB system (or a MACS with DIRCM system) performs laser based jamming of the incoming threat.

The present invention may provide a dual frequency system, which firstly analyzes the input(s) coming from the MWS system, then performs tracking algorithm(s) in order to overcome the low tracking accuracy of such active pulse Doppler MWS systems, and then starts transmitting and performing the MACS-D-LB operations.

The present invention may thus provide a Directional IR counter-measure (DIRCM) that is capable of being integrated with active pulse Doppler MWS system(s) that have low tracking accuracy, and which also reduces false alarms and provides additional and/or more accurate threat information.

Some embodiments of the present invention may utilize dual-frequency mono-pulse tracking radar systems; dual-frequency planar antennas; and/or multi-spectral transparent composite materials.

In some demonstrative embodiments of the present invention, a system for protecting an aircraft against incoming threats, comprises: (a) a dual-band Radio Frequency (RF) track-and-confirm module comprising: a dual-band RF receiver to receive high-band RF signals and low-band RF signals; a threat confirmation module to confirm a possible incoming threat based on processing of RF signals received at the dual-band RF receiver; a threat parameters calculator to calculate a fine angular position and a precise angular position of a confirmed incoming threat, based on processing of RF signals received at low-band RF for fine angular position and at high-band RF for precise angular position; (b) a countermeasure directed Laser module to activate a directed Laser countermeasure towards said precise angular position of said confirmed incoming threat.

In some demonstrative embodiments of the present invention, the dual-band RF receiver comprises: a passive low-band receiver sub-unit able to receive incoming low-band RF signals without transmitting any RF waveforms by said dual-band RF track-and-confirm module.

In some demonstrative embodiments of the present invention, the system comprises: a pulse Doppler radar Missile Warning System (MWS) comprising a waveform transmitter; wherein the dual-band RF track-and-confirm module is a passive receiving module that avoids transmitting of waveforms, and that receives a return of the waveform transmitted by said waveform transmitter of said pulse Doppler radar MWS.

In some demonstrative embodiments of the present invention, the dual-band RF receiver comprises: a high-band RF receiver sub-unit to receive high-band RF signals; a low-band RF receiver sub-unit to receive low-band RF signals; and a dual-band receive antenna connected to both said high-band RF receiver sub-unit and said low-band RF receiver sub-unit. unit.

In some demonstrative embodiments of the present invention the dual-band RF receiver comprises: a high-band RF receiver sub-unit to receive high-band RF signals; a low-band RF receiver sub-unit to receive low-band RF signals; wherein both the high-band RF receiver sub-unit and the low-band RF receiver sub-unit are implemented within a same RF module.

In some demonstrative embodiments of the present invention, the dual-band RF track-and-confirm module comprises: a spectrum range selector to select a spectrum range in which the dual-band RF track-and-confirm module is to operate, based on (a) one or more threat parameters generated by the threat parameters calculator, and (b) one or more threat parameters generated by the active pulse Doppler MWS.

In some demonstrative embodiments of the present invention, the threat parameters calculator comprises: a fine angular position calculator to calculate a fine angular position with an error of up to 1 degree, of said confirmed incoming threat, based exclusively on (a) processing of low-band RF signals received at low-band RF, and (b) aircraft real-time navigation data; wherein the fine angular position calculator operates without taking into account RF signals received at high-band RF.

In some demonstrative embodiments of the present invention, a precise angular position calculator to calculate a precise angular position of said confirmed incoming threat, based on (a) processing of high-band RF signals received at high-band RF, and (b) aircraft real-time navigation data, and (c) the fine angular position of said confirmed incoming threat as calculated from passive received low-band RF signals.

In some demonstrative embodiments of the present invention, the dual-band RF track-and-confirm module comprises: a passive low-band RF receiver sub-unit to receive low-band RF signals without transmitting low-band RF signals; a high-band RF transmitter to transmit high-band RF signals; a high-band RF receiver sub-unit to receive high-band RF signals.

In some demonstrative embodiments of the present invention, the dual-band RF track-and-confirm module comprises: a transmitter/receiver selector (a) to selectively activate and deactivate the passive low-band RF receiver sub-unit, and (b) to selectively activate and deactivate the high-band RF receiver sub-unit, and (c) to selectively activate and deactivate the high-band RF transmitter sub-unit.

In some demonstrative embodiments of the present invention, the transmitter/receiver selector is to selectively activate the high-band RF transmitter and the high-band RF receiver, based on processing of low-band RF signals received at previously-activated said passive low-band RF receiver sub-unit.

In some demonstrative embodiments of the present invention, the system further comprises: a countermeasure selector to select a countermeasure for activation against the confirmed incoming threat, out of a plurality of countermeasures available on said aircraft, based on RF signals received at the high-band RF.

In some demonstrative embodiments of the present invention, the system further comprises: a gimbal mechanism comprising a dual-axis steering gimbal, to slew towards the confirmed incoming threat (a) the dual-band RF track-and-confirm module, (b) the countermeasure directed laser module, and (c) a dual-band antenna associated with the dual-band RF track-and-confirm module.

In some demonstrative embodiments of the present invention, the countermeasure directed Laser module comprises a multi-spectral Laser transmitter to transmit multi-spectral Laser transmission towards the confirmed incoming threat.

In some demonstrative embodiments of the present invention both the countermeasure directed Laser module and the dual-band RF track-and-confirm module are mounted on, and slewed by, a same gimbal mechanism.

In some demonstrative embodiments of the present invention, the threat parameters calculator of the dual-band RF track-and-confirm module takes into account, and optimizes signal processing by using, real-time radar information obtained from the pulse Doppler radar MWS.

In some demonstrative embodiments of the present invention, the dual-band RF track-and-confirm module performs threat tracking and threat confirmation on both low-band RF and high-band RF by utilizing a pulse Doppler radar technique.

In some demonstrative embodiments of the present invention, the system further comprises: a countermeasure waveform constructor to construct a waveform of a countermeasure based on threat parameters calculated by taking into account both incoming low-band RF signals and incoming high-band RF signals.

In some demonstrative embodiments of the present invention, the system further comprises: a radome to encapsulate the dual-band RF track-and-confirm module and the countermeasure directed Laser module; wherein the radome enables transmission through the radome of (a) electromagnetic signals on low-band RF, and (b) electromagnetic signals on high-band RF, and (c) optical signals.

In some demonstrative embodiments of the present invention, the system further comprises: a radome to encapsulate the dual-band RF track-and-confirm module and the countermeasure directed Laser module; wherein the radome enables transmission through the radome of (a) electromagnetic signals on low-band RF, and (b) electromagnetic signals on high-band RF, and (c) Laser signals.

In some demonstrative embodiments of the present invention, the dual-band RF receiver comprises a plurality of antenna elements to receive low-band RF signals and high-band RF signals; wherein at least some of the plurality of antenna elements form a circle around said countermeasure directed Laser module.

In some demonstrative embodiments of the present invention, the dual-band RF receiver comprises a plurality of radiating elements to receive low-band RF signals and high-band RF signals; wherein all of the plurality of antenna elements surround said countermeasure directed Laser module.

In accordance with some demonstrative embodiments of the present invention, the dual-band RF receiver comprises a plurality of antenna elements to receive low-band RF signals and high-band RF signals; wherein the plurality of antenna elements are divided into four regions.

In some demonstrative embodiments of the present invention, the dual-band RF receiver comprises a plurality of antenna elements to receive low-band RF signals and high-band RF signals; wherein the plurality of antenna elements are divided into four regions; wherein RF signals received by the plurality of antenna elements are processed using Sigma/Delta mono-pulse tracking.

In accordance with some demonstrative embodiments of the present invention, the dual-band RF receiver comprises a plurality of antenna elements to receive low-band RF signals and high-band RF signals; the plurality of antenna elements are divided into four regions; RF signals received by the plurality of antenna elements are processed using phase tracking.

In some demonstrative embodiments of the present invention, the dual-band RF receiver comprises a plurality of antenna elements to receive low-band RF signals and high-band RF signals; the plurality of antenna elements are divided into four regions; each region of said four regions comprises a single low-frequency radiating element inter-connected with a plurality of high-frequency radiating elements.

In some demonstrative embodiments of the present invention, the system further comprises: a central processor to select a countermeasure technique, out of a plurality of countermeasures techniques available on said aircraft, based on a data fusion algorithm that fuses data from the dual-band RF track-and-confirm module and one or more of: altitude of the aircraft, attitude of the aircraft, height of the aircraft, number of concurrently incoming threats, directions of concurrently incoming threats, number of protection systems installed on the aircraft, angular coverage of protection systems installed on the aircraft, and calculated threat parameters.

Some embodiments of the present invention may provide other and/or additional benefits or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION OF THE PRESENT INVENTION

Figure 1:
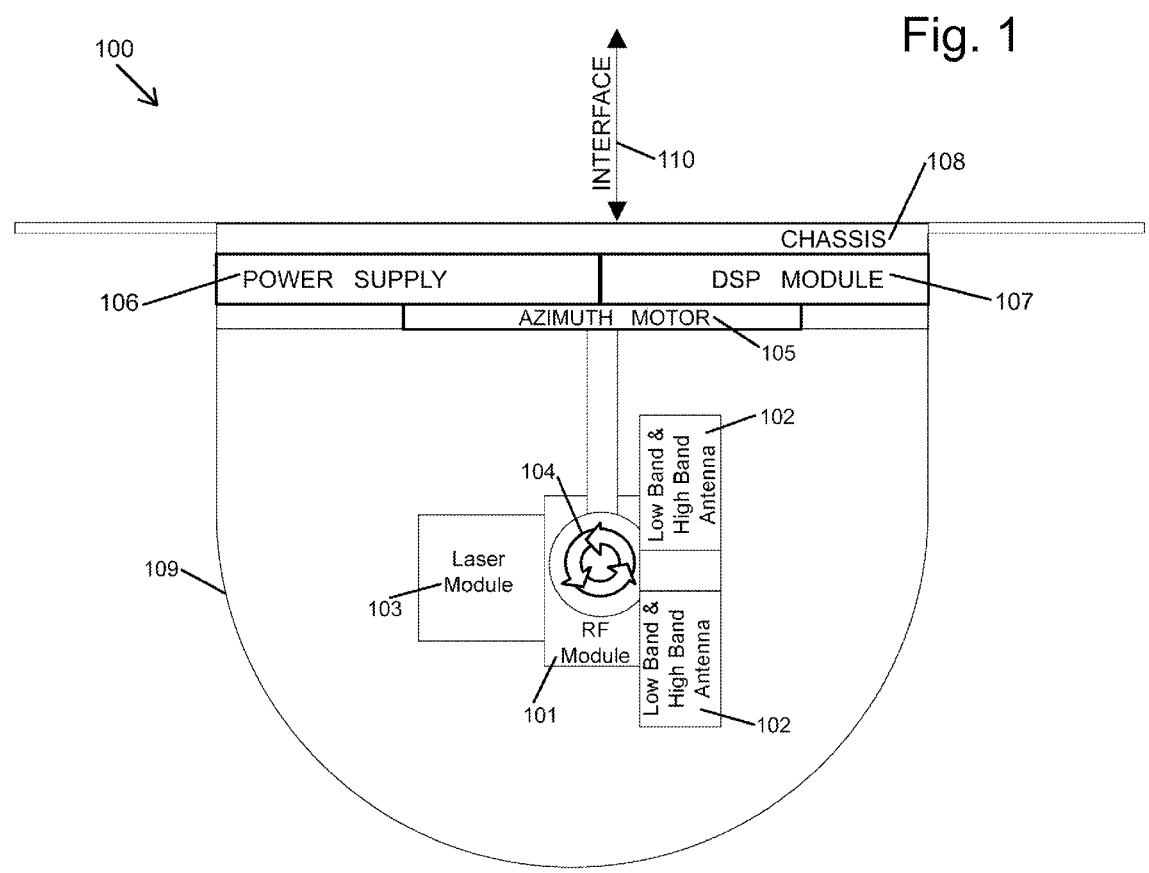
FIG. 1 is a schematic block diagram illustration of an aircraft protection system, demonstrating a Dual RF Frequency Band unified Radar Verification Sensor (RVS) with Directed Infrared Counter Measure (DIRCM), in accordance with some demonstrative embodiments of the present invention.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

The terms "plurality" or "a plurality" or "multiplicity" as used herein include, for example, "multiple" or "two or more". For example, "a plurality of items" includes two or more items.

Although portions of the discussion herein relate, for demonstrative purposes, to wired links and/or wired communications, some embodiments are not limited in this regard, and may include one or more wired or wireless links, may utilize one or more components of wireless communication, may utilize one or more methods or protocols of wireless communication, or the like. Some embodiments may utilize wired communication and/or wireless communication.

The term "aircraft" as used herein includes, for example, an airborne platform or object or vehicle; a vehicle or object which is able to fly through the air or through an atmosphere of a planet; a vehicle or object which is able to sustain itself above the ground; an airplane; a helicopter; a manned aircraft; an unmanned aircraft; a Remotely Piloted Vehicle (RPV); an Unmanned Aerial Vehicle (UAV); a fixed-wing aircraft; a rotorcraft or rotary-wing aircraft; an autogyro or gyroplane; a powered aircraft; an unpowered aircraft (e.g., a glider, a paraglider, a balloon, a kite); an aircraft having one or more propellers; a jet propulsion aircraft; a military aircraft (e.g., a fighter, a bomber, a fighter-bomber, a ground-attack aircraft, an attack helicopter); a civilian aircraft (e.g., commercial, executive, cargo); a rocket; a missile; a rocket-powered aircraft; a spaceship; a space shuttle; a manned or unmanned space vehicle or aircraft or ship; or the like.

The terms "aircraft" or "protected aircraft" as used herein may relate to an aircraft which is being protected or is intended to be protected against incoming threats; or an aircraft on which a self-protective system, in accordance with some embodiments, is installed or mounted.

The terms "incoming threat", "airborne threat", or "threat", as used herein include, for example, a missile, a rocket, a bomb, a self-propelled projectile, an airborne missile, an airborne object directed towards a protected aircraft, a missile having an engine and/or a warhead, a cruise missile, a guided missile, or the like. In some embodiments, optionally, the term "threat" may relate to a verified threat, a non-verified threat, a confirmed threat, an unconfirmed threat, a possible threat, an estimated threat, or other types of threats.

Applicants have realized that conventional pulse Doppler radar Missile Warning Systems that are installed on aircrafts, may provide only a rough angular sector of threat angular position (in the range of tens of degrees), but do not provide a precise threat angular position information (below 1 degree), as required for the use of DIRCM in order to counter the incoming threat.

Applicants have realized that the lack of provision of threat precise information by pulse Doppler radar Missile Warning Systems allows only the utilization of flare dispensing (or decoys) systems, or allows only the installation and utilization of Omni-Directional Infra-Red Countermeasure (IRCM)

systems, which do not require precise angular information of the incoming threat but are less effective against such incoming threats.

Applicants have realized that utilization of Directional Infra-Red Counter-Measure (DIRCM) systems may require a provision of precise angular information of incoming threats, with a precision below 1 degree.

Applicants have realized that a partial solution to the required angular accuracy for the use of a DIRCM system, based on a low angular accuracy active pulse Doppler MWS, may be adding additional MWS sensors that are based on passive electro optical sensing technology, that have the capability to provide the required accuracy for pointing a DIRCM system at the incoming threat and performing Directional (e.g., Laser based) IR Counter Measures. However, the applicants have realized that the usage of additional independent sensors for provision of threat precise angular information to the DIRCM significantly increases the system volume, weight, and/or cost, and significantly complicates the system installation onboard the aircraft. In fact, this type of solution is making use of two independent MWS systems.

Applicants have further realized that the usage of additional electro-optic sensors for the provision of threat precise angular information to the DIRCM may not provide sufficient parameters for threat classification, and thus may decrease the DIRCM countermeasure effectiveness.

Applicants have also realized that pulse Doppler radar Missile Warning Systems, which use a single frequency band for the operation, have a false alarm rate that degrades the system's reliability, and increases workload and overhead of the aircraft crew or aircraft operators.

In some embodiments of the present invention, for example, a system for protecting an aircraft against incoming threats may comprise: an active Pulse-Doppler radar Missile Warning System (MWS) to substantially continuously search for the incoming threat, to generate a signal indicating that a possible incoming threat is detected, and to provide a rough (e.g., sector) angular position of the incoming threat. The system may further comprise one or more Dual RF Band unified Radar Verification Sensor(s) (RVS) with Directed Infrared Counter Measure (DIRCM)—i.e. MACS-D-LB, to be activated in response to the threat indication, to confirm the threat existence using both radar frequency bands, to provide a fine threat angular position using the low frequency radar band, to provide an accurate threat angular position using the high frequency radar band, to supply additional high accuracy data (e.g., high accuracy threat data), and to activate the DIRCM functionality in order to defeat the incoming threat.

In some embodiments, the pulse Doppler radar MWS unit(s) may operate in Low-Band frequency regions such as, for example, L-Band, S-Band and/or C-Band. In some embodiments, L-Band may include the range of 1 to 2 GHz; whereas S-Band may include the range of 2 to 4 GHz; and whereas C-Band may include the range of 4 to 8 GHz.

In some embodiments, the one or more Dual RF Frequency Band unified RVS with DIRCM may be implemented as a single Line Replaceable Unit (LRU) that performs both tracking and confirmation, using both radar frequency bands, tracking in both frequency bands and countermeasure functions based on the integral Laser based IR counter measure.

In some embodiments, the one or more Dual RF Frequency Band unified RVS with DIRCM may be a gimbaled slewed sensor.

In some embodiments, the Dual RF Frequency Band unified RVS with DIRCM may be slewed to the incoming threat's rough angular position as provided by pulse Doppler radar MWS unit.

In some embodiments the low radar frequency band of the Dual RF Frequency Band unified RVS with DIRCM may operate only as receiver for the signals that were transmitted by the pulse Doppler radar MWS, in parallel operation to the range Doppler radar MWS.

In some embodiments, the low frequency band of the Dual RF Frequency Band unified RVS with DIRCM may be L-Band, S-Band and/or C-Band, and may be similar to the frequency band that is used by the pulse Doppler radar MWS.

In some embodiments, the low radar frequency of the Dual RF Frequency Band unified RVS with DIRCM may perform tracking and confirmation of threat presence, and/or may perform threat tracking, in parallel to threat detection by the pulse Doppler radar MWS.

In some embodiments, the Dual RF Frequency Band unified RVS with DIRCM may constantly receive and/or constantly analyze the radar signal data parameters from the pulse Doppler radar MWS for performance optimization of the low frequency band.

In some embodiments, the low radar frequency band of the Dual RF Frequency Band unified RVS with DIRCM may perform calculation of threat fine angular position that may be sufficiently precise for the activation of the high radar frequency band but may not be sufficiently precise for the activation of the DIRCM functionality.

In some embodiments, the high frequency band of the Dual RF Frequency Band unified RVS with DIRCM may be part of Ka-Band frequency region (e.g., from 26.5 to 40 GHz).

In some embodiments, the high radar frequency band of the Dual RF Frequency Band unified RVS with DIRCM may perform threat additional tracking and confirmation, and calculation of threat precise angular position that may be sufficiently precise for activation of the DIRCM functionality.

In some embodiments, the high frequency band of the Dual RF Frequency Band unified RVS with DIRCM may operate as a complete radar system with both transmitter functionality and receiver functionality.

In some embodiments, the DIRCM functionality activation may be performed only after threat tracking and confirmation by both the low and the high frequency band functions of the Dual RF Frequency Band unified RVS with DIRCM.

In some embodiments, the tracking and confirmation functionality of both frequency bands in the Dual RF Frequency Band unified RVS with DIRCM may be activated only after receiving the threat signal from the central computer; and may be non-activated prior to receiving such threat signal from the central computer.

In some embodiments, the low and high frequency band tracking and confirmation functionality of the Dual RF Frequency Band unified RVS with DIRCM may provide threat type or family classification data, such as threat range, threat velocity, threat radar cross-section, threat rotation and/or threat trajectory, and these parameters may be used for more effective and/or more accurate directional countermeasure functionality.

In some embodiments, the calculation of fine and precise angular position of the incoming threat using the tracking and confirmation functionality and both frequency bands of Dual RF Frequency Band unified RVS with DIRCM may be performed by methods such as, for example, dual axis sigma/delta calculation or mono-pulse tracking, amplitude comparison, phase comparison, and/or other suitable methods.

In some embodiments, the calculation of fine and precise angular position of the threat using the tracking and confirmation functionality and both frequency bands of Dual RF Frequency Band unified RVS with DIRCM may be performed by using the same hardware components (e.g., same RF module, connected to same receive antenna or same set of receive antennas) to allow for space and weight savings.

In some embodiments, the functionality of both frequency bands of Dual RF Frequency Band unified RVS with DIRCM may be implemented using a single multi-layer antenna, or other suitable type of dual frequency band of antenna.

In some embodiments, the DIRCM functionality of the Dual RF Frequency Band unified RVS with DIRCM may be based on multi-spectral laser that may be based on, but not limited to, near infrared and mid-wave infrared wavelengths.

In some embodiments, the direct infrared countermeasure waveform may be based on the tracking and confirmation results of the low and high frequency bands of Dual RF Frequency Band unified RVS with DIRCM.

In some embodiments, the DIRCM waveform may be updated during the countermeasure process, for example, based on the updated tracking and confirmation results of the low and high frequency bands of Dual RF Frequency Band unified RVS with DIRCM.

In some embodiments, a radome may cover the Dual RF Frequency Band unified RVS with DIRCM; the radome may be constructed from materials that allow transmission of low and high radar frequency bands and also the transmission of multispectral laser DIRCM signal(s).

At an overview, some embodiments may include devices, systems, and methods of protecting aircrafts against incoming threats. In particular, some embodiments may comprise one or more unified Missile Approach Confirmation Sensor(s) (MACS) with integral Directed Infra-Red Countermeasure (DIRCM) and Low Band (LB) frequency receiver support, which may be used as an airborne self-protective system (e.g., for aircrafts) with or without one or more other airborne counter-measure devices (e.g., flare dispensers).

In some embodiments, a missile protection system of an aircraft may comprise: an active pulse-Doppler radar Missile Warning System (MWS), that continuously or substantially continuously monitors the airspace around an aircraft for incoming threats (e.g., airborne missiles) or for signals indicating a possible incoming threats; and Dual RF Frequency Band Unified Radar Verification Sensor (RVS) with DIRCM. The low frequency band of the Dual RF Frequency Band Unified RVS with DIRCM may be used for passive first tracking in order to extract the fine angular position (in the range of 1 degree) and confirmation of the threat.

If the incoming threat is confirmed by the low frequency band, and the fine angular position of the incoming threat is extracted, the high frequency band of the Dual RF Frequency Band Unified RVS with DIRCM may be activated for additional purposes, particularly to activate tracking and confirmation and extraction of the precise angular information (smaller than 1 degree error) of the incoming threat.

If the incoming threat is confirmed by both low and high frequency bands, the DIRCM functionality of the Dual RF Frequency Band Unified RVS with DIRCM may be activated in order to launch or deploy a suitable countermeasure against the confirmed incoming threat. Information from the pulse Doppler radar MWS, as well as from an Inertial Measurement Unit (IMU), may be provided to the Dual RF Frequency Band Unified RVS with DIRCM, directly and/or indirectly (e.g., via a central computer or processor or controller).

The DIRCM countermeasure waveform may be constructed and/or modified in real-time, for example, according to the information that is provided by the low and high frequency bands of the Dual RF Frequency Band Unified RVS with DIRCM; and may be based on, for example, threat range, velocity Signal to Noise Ratio (SNR), roll rate, and/or other suitable threat-related parameters.

Optionally, the Dual RF Frequency Band Unified RVS with DIRCM may comprise more than one Laser countermeasure transmitter(s), which may be installed, for example, on a moving part of a mechanical gimbal.

In some embodiments the installation onboard the aircraft of a Dual RF Frequency Band Unified RVS with Directed Infrared Counter Measure may include more than one sensor thus enabling better coverage of the protection and avoiding any obstructions to the sensors field of view due to installation aspects and the aircraft structure.

The usage of Dual RF Frequency Band Unified RVS with DIRCM may decrease the false alarm rate of the pulse Doppler radar MWS, thereby improving the system's overall operational reliability, accuracy and/or effectiveness.

The usage of both low and high Radio Frequency (RF) bands may provide the precise angular accuracy of the threat, which may be required for the activation of the DIRCM functionality of the Dual RF Frequency Band Unified RVS with DIRCM, while the pulse Doppler radar MWS is installed onboard the aircraft.

In some embodiments, a radome structure may protect the Unified RVS with DIRCM, and may be constructed of one or more material(s) to enable multispectral transparency which may be required for transmission of both RF frequency bands in the L and Ka Bands and High powered laser in the Mid-Infra-Red (MIR) and the Short-Wavelength IR (SWIR) ranges.

Reference is made to FIG. 1, which is a schematic block diagram illustration of an aircraft protection system 100 demonstrating a Dual RF Frequency Band Unified RVS with DIRCM, in accordance with some demonstrative embodiments of the present invention. System 100 may be mounted on an aircraft, or may be attached or connected to an aircraft, or may be constructed as an integrated or integral part of an aircraft.

RF Module 101 may be connected to dual frequency bands antenna 102, high power laser transmitter 103 and elevation motor 104. The RF module may be used by various parts of the Dual RF Frequency Band Unified RVS with DIRCM, for example, for switching between the low and high frequency waveforms to be received and sampled; receiving the low frequency waveform that is transmitted by the pulse Doppler radar MWS; generating high frequency transmitted (Tx) waveform and its amplification towards the transmission to the dual frequency bands antenna 102; receiving the high frequency transmitted waveform; frequency down-conversion that may be applicable for both low and high frequency bands; amplification of the received signal on both frequency bands; sampling and/or other signal processing operations.

Dual frequency bands antenna 102 may be used for reception of the low frequency electromagnetic signal, as well as transmission and reception of the high frequency electromagnetic signal, which may be used for verification of the threat and/or for calculation of the precise angular position of the threat. Dual frequency bands antenna 102 may comprise submodules to enable the algorithm(s) of gathering the threat direction at the required accuracy level. Dual frequency bands antenna 102 may comprise multiple layers to allow multi bands operation. Dual frequency bands antenna 102 may comprise, or may be associated with, multiple or different interfaces for the low and high frequency bands operation. The multi layer architecture of dual frequency bands antenna 102 may utilize a dual layer patch technique, or other technique(s). Dual frequency bands antenna 102 may have a precise built-in aperture or cavity or window for outputting laser module 103 signal through the center of the antenna 102;

or may otherwise have a structure in which antenna elements surround or encircle (partially or entirely) around the high-power Laser transmitter 103.

High power Laser transmitter(s) 103 may be used for transmission of high power Laser waveform, for example, towards an incoming threat (e.g., towards a confirmed incoming threat). The transmitted Laser waveform may be constructed of various types of signals, for example, pulse wave, linear frequency modulated signal, and/or constant wave in various IR spectral wavelengths. The transmitted waveforms may be in two or more IR spectral wavelengths simultaneously.

Elevation motor 104 may be used for moving RF module 101, dual frequency antenna 102 and/or high power laser transmitter 103 along the elevation axis. The definition of the elevation axis may be performed according to, for example, the aircraft's elevation axis. Elevation motor 104 may be connected to azimuth motor 105.

Azimuth motor 105 may be used for moving RF module 101, dual frequency antenna 102, high power laser transmitter 103 and/or elevation motor 104 along the azimuth axis. The definition of the azimuth axis may be performed according to, for example, the aircraft's azimuth axis. Azimuth motor 105 may be connected to mechanical chassis 108.

Mechanical chassis 108 may be used for internal installation of power supply 106 and DSP module 107. For example, power supply 106 and DSP Module 107 may have a configuration of a single joint electronic board having multiple electronic boards that may be connected together, or other suitable configuration. Mechanical chassis 108 may comprise one or more external electrical connectors that may be used as connection to interface 110 with the A/C, pulse Doppler radar MWS and the central computer.

DSP module 107 may comprise a digital signal processor or other suitable processor or controller which may perform, for example, processing of the data generated from both low and high frequency bands of the Dual RF Frequency Band Unified RVS with DIRCM, pre-triggering of the countermeasure functionality of the unified RVS, calculation of threat fine angular position out of low frequency band data for activation of the high frequency band functionality, and/or calculation of threat precise angular position for activation of the DIRCM functionality and controlling the elevation motor 104 and azimuth motor 105.

Radome 109 may be a housing or enclosure for holding and/or encapsulating and/or protecting one or more components of the system, for example, RF Module 101, any gimbals or gimbaling elements as well as elevation motor 104 and azimuth motor 105, dual frequency bands antenna 102, and high power laser 103. Radome 109 may allow transparent transmission of high radio frequency band and the laser energy and reception of RF energy from both low and high radio frequency bands. Radome 109 may have an aerodynamic shape for reducing the aerodynamic effects of installation of the system on the aircraft.

Figure 2:
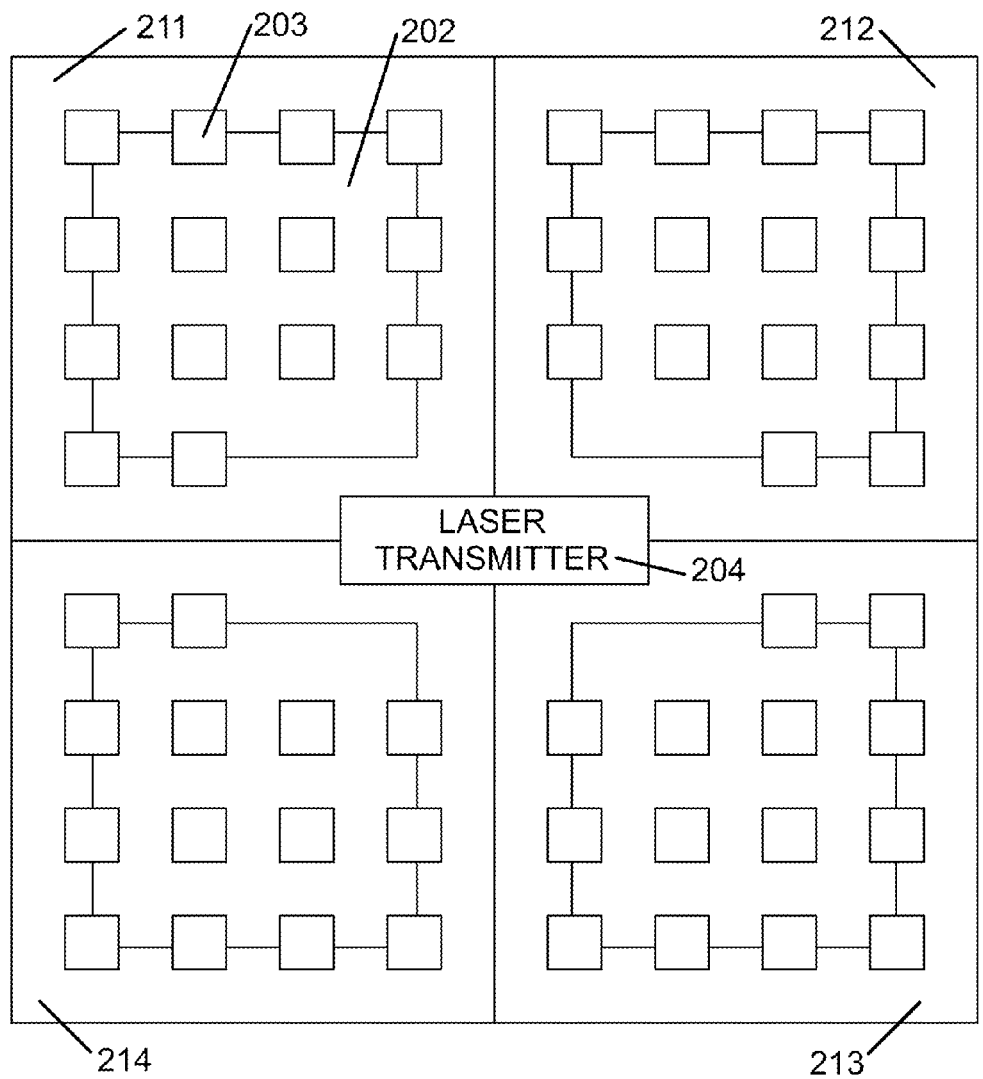
FIG. 2 is a schematic block diagram illustration of an antenna, demonstrating antenna architecture of the Dual RF Frequency Band unified RVS with DIRCM, in accordance with some demonstrative embodiments of the present invention.

FIG. 2 is a schematic block diagram illustration demonstrating architecture and components of a dual frequency bands antenna 201 that may be part of Dual RF Frequency Band Unified RVS with DIRCM, in accordance with some demonstrative embodiments of the present invention.

Dual frequency bands antenna 201 may be structured and/or may operate as, for example, multi layer patch antenna, multi layer patch antenna with stacked dipoles, or other suitable antenna types.

Dual frequency bands antenna 201 may be divided into multiple regions, for example, four quarters 211-214. The division of antenna 201 may allow implementing techniques for threat fine and precise angular position calculation using both low and high radio frequency bands of Dual RF Frequency Band Unified RVS with DIRCM. Such techniques may include, for example, Sigma/Delta (Mono-pulse Tracking), phase comparison, or other suitable techniques.

Each one of quarters 211-214 of antenna 201 may be constructed from one or more low frequency radiating elements 202 and one or more high frequency radiating elements 203. Radiating elements 202 may be used for receiving the low frequency electromagnetic signal that was transmitted by the pulse Doppler radar MWS. The number of low frequency radiating elements 202 may vary, and is not limited to one per each quarter. Radiating elements 203 may be used for transmitting and receiving the high frequency electromagnetic signals. The number of high frequency radiating elements 203 may vary and is not limited to 14 per each quarter. Radiating elements 202 or 203 may be constructed using various or different techniques, for example, patches, slots, stacked dipoles, or other suitable techniques.

Low frequency radiating elements 202 and high frequency radiating elements 203 may be connected or inter-connected with each other, using various techniques, for example, power dividing network, waveguide based interconnections, or other suitable techniques.

Figure 3:
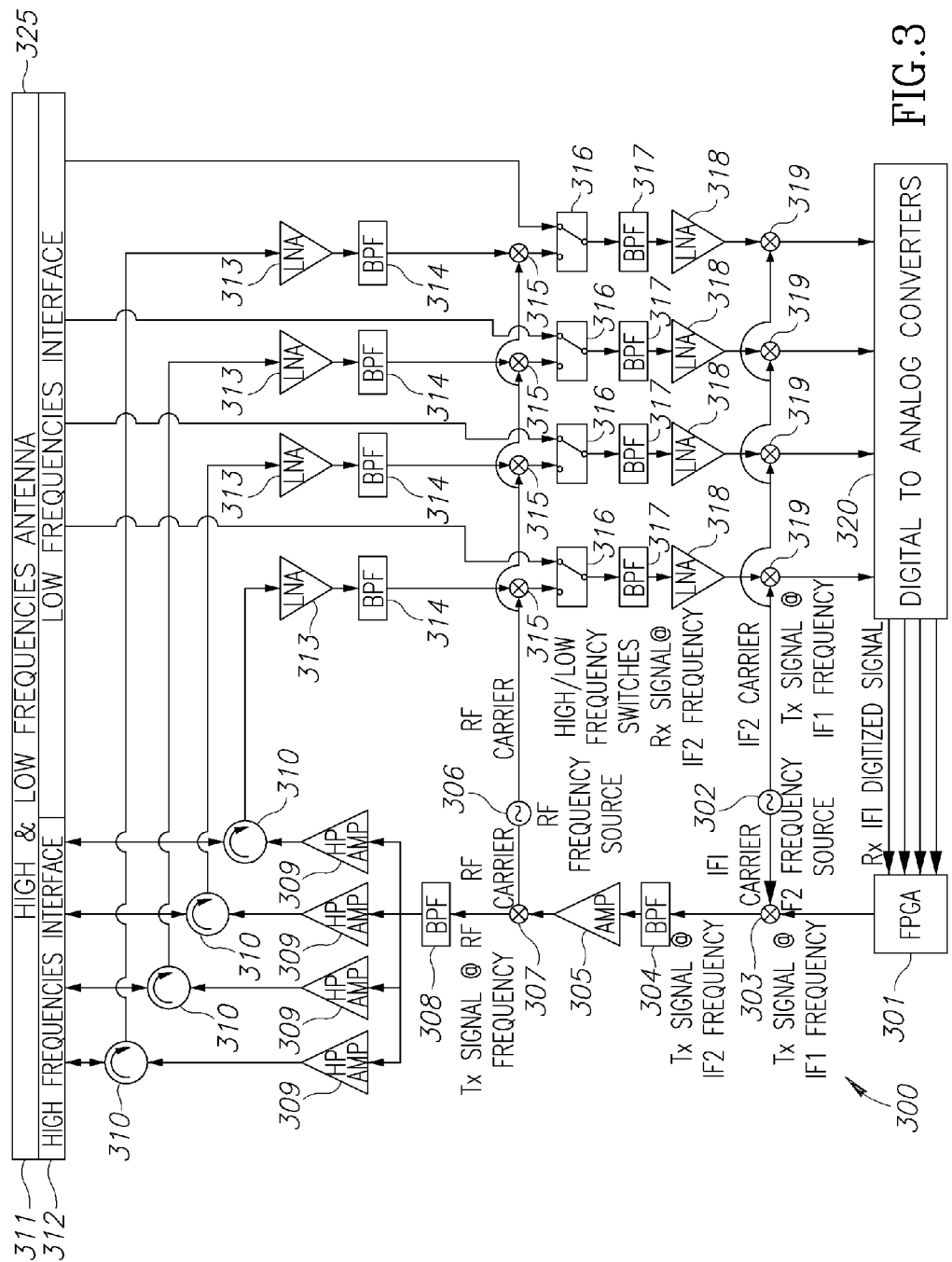
FIG. 3 is a schematic block diagram illustration of an RF module, in accordance with some demonstrative embodiments of the present invention.

Reference is made to FIG. 3, which is a schematic block diagram illustration of an RF Module 300 which may be part of Dual RF Frequency Band Unified RVS with DIRCM, in accordance with some demonstrative embodiments of the present invention. FIG. 3 may demonstrate architecture of the Dual RF Frequency Band unified RVS with DIRCM that comprises an implementation of a high and low frequency transmitter and receiver with array beam forming, high frequency receiver and low frequency receiver that may utilize a dual axis sigma/delta architecture; other suitable architectures or components may be used.

High frequency transmitted (Tx) waveform may be generated and up-converted to a First Intermediate Frequency (IF1) using a Field-Programmable Gate Array (FPGA) 301 or other suitable transmitter or component for generation of radar transmission waveforms.

A Second Intermediary Frequency (IF2) may be generated by IF2 Source 302, which may generate the IF2 carrier; and this carrier may be multiplied using a mixer 303 with the high frequency waveform that was created by FPGA 301.

The IF2 Tx waveform that is the output of mixer 303 may be filtered using a Band Pass Filter (BPF) 304, may be amplified using an amplifier 305, and may be up-converted to the RF frequency using a mixer 307 and the RF carrier signal that is created using an RF Source 306.

The RF Tx waveform that is the output of mixer 307 may be filtered using a BPF 308, and may be divided to multiple (e.g., four) Tx signals; each of the signals may be amplified independently using power amplifier(s) 309. The number of power amplifiers 309 is for demonstrative purposes only, and is not limited to four; other suitable number may be used.

The RF Tx waveform, after being amplified using power amplifiers 309, may be fed through circulators or switches 310 to antenna high frequency interfaces 311. Circulators or switches 310 may provide or may improve isolation between the Tx and Rx high frequency signals using the same antenna interface. Circulators or switches 310 are depicted for demonstrative purposes only, and other isolation methods or components may be used for to provide or to enhance the isolation between the Tx and Rx high frequency signals using the same antenna interface.

Antenna high frequency interfaces 311 may further be used for receiving the high frequency RF Rx signals (e.g., from high and low frequency antennas 325) that may then pass through circulators or switches 310, may be amplified using Low Noise Amplifiers (LNAs) 313, may be filtered using BPFs 314, and may be down-converted to the IF2 frequency using mixers 315 and RF source 306.

Switches 316 may be used for selection between (a) the low frequency RF Rx signals that are received (e.g., from high and low frequencies antenna 325) using antenna low frequency interfaces 312, and (b) the high frequency IF2 Rx signals that are created or generated using mixers 315. Switches 316 may be controlled using FPGA 301, or using other suitable controller or Integrated Circuit (IC) or component.

The high or low frequency signals that are selected using switches 316, may be filtered using BPFs 317, may be amplified using LNAs 318, and may be down-converted to the IF1 frequency using mixers 319 and IF2 Source 302.

The high or low frequency signals, that are at IF1 frequency, may be sampled using Digital to Analog Converters (DACs) 320, and the output of DACs 320 may be provided to FPGA 301 for further signal processing and digitization.

FPGA 301 may perform part of the signal processing algorithms for confirmation, as well as fine and precise tracking of the threat; and may provide digital outputs (for example, to DSP module 107 of FIG. 1). Further signal processing and algorithms for confirmation, fine and precise tracking, may be performed in or by additional units, FPGA, processors and/or other logical devices in DSP module 107 of FIG. 1.

Figure 4A:
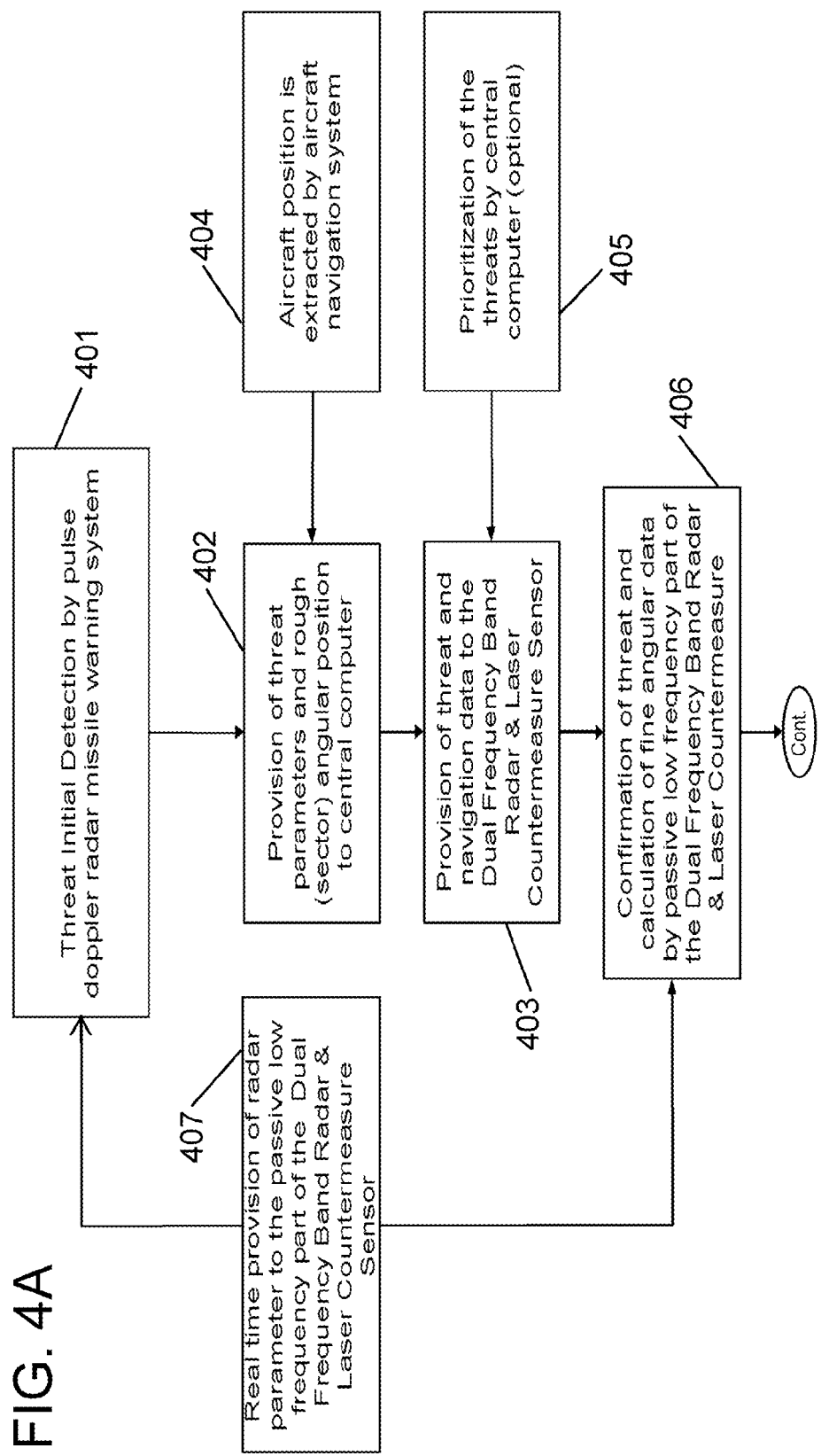
FIGS. 4A-4B are a flow-chart of a method of dual frequency tracking and confirmation, as well as countermeasure activation, in accordance with some demonstrative embodiments of the present invention.
Figure 4B:
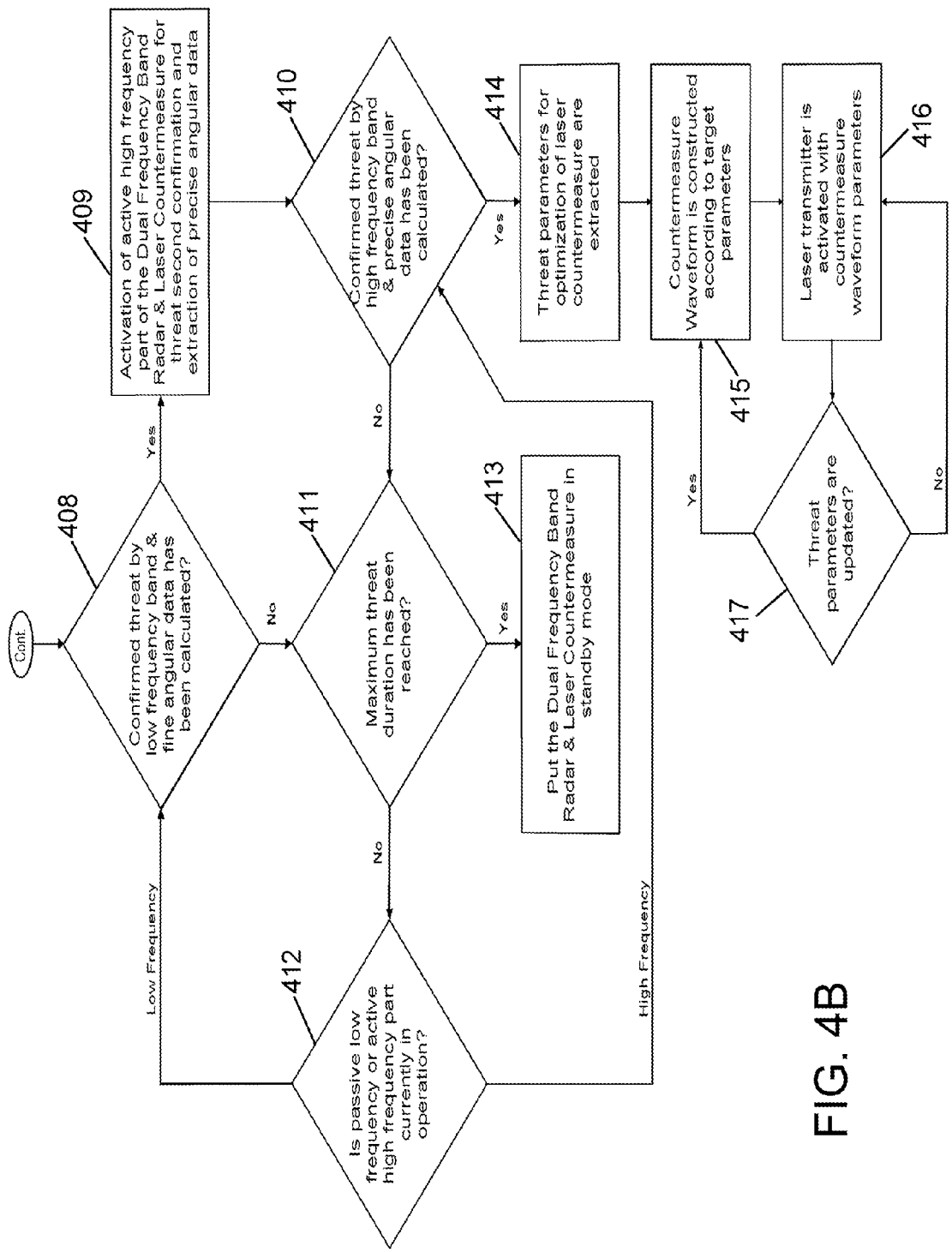

Reference is made to FIGS. 4A-4B, which are a schematic flow-chart of a method of dual frequency tracking and confirmation as well as countermeasure activation, in accordance with some demonstrative embodiments of the present invention.

Threat initial detection (block 401) may be performed by a pulse Doppler radar MWS that may be installed onboard the aircraft or may be otherwise mounted on (or connected to) the aircraft.

After the threat initial detection was performed (block 401), a process of extraction of threat parameters may be performed (block 402). Such parameters may comprise, for example, threat velocity, threat range, and rough (sector) threat angular position in azimuth and elevation angles. The extraction of parameters may also be based on the aircraft platform navigation data that may be provided by the aircraft navigation system (block 404).

After extraction of threat parameters (block 402), the threat data and navigation data may be provided (block 403) to the Dual RF Frequency Band Unified RVS with DIRCM. The threat data may include the prioritized data by the optional central computer (block 405).

Tracking and confirmation of the threat and calculation of its fine angular data may be performed (block 406), for example, using the passive low frequency part of the Dual Frequency Band Radar and Laser Countermeasure Sensor.

During the tracking and confirmation of the threat using the passive low frequency part of the Dual Frequency Band Radar and Laser Countermeasure (block 406), real time radar parameters may be provided (block 407) by pulse Doppler radar MWS.

The method may proceed based on the result of threat tracking and confirmation using the passive low frequency part of the Dual Frequency Band Radar and Laser Countermeasure Sensor (block 408). If the result is positive, then activation of the active high frequency part of the Dual Frequency Band Radar and Laser Countermeasure may be performed (block 409).

If the result of threat tracking and confirmation using the passive low frequency part of the Dual Frequency Band Radar & Laser Countermeasure Sensor is negative, then the tracking and confirmation may be performed (e.g., repeatedly, continuously, for multiple iterations, or the like) until a maximum threat duration has been reached (block 411). The maximum threat duration may be a value represented by a parameter, which may be hard-coded or preset, or may be modifiable.

If the target (e.g., the incoming threat) has been confirmed by the high frequency part of the Dual Frequency Band Radar and Laser Countermeasure and its precise angular data has been calculated (block 410), then threat parameters for direct infrared Laser countermeasure may be extracted (block 414). Such parameters may comprise, for example, threat range, threat velocity, threat roll rate, and other suitable threat-related parameters or characteristics that may be used for optimization of countermeasure techniques or optimization of countermeasure effectiveness.

If the maximum threat duration has been reached (block 411), then the Dual Frequency Band Radar and Laser Countermeasure may be put in standby mode (block 413) or other suitable partial-operation mode or waiting mode.

If the maximum threat duration has not been reached, then the system may check which frequency part of the Dual Frequency Band Radar and Laser Countermeasure is currently in operation (block 412).

According to the result of this check (block 412), and in case the maximum threat duration has not been reached (block 411), the low or high frequency part of the Dual Frequency Band Radar and Laser Countermeasure may continue its operation.

After extraction of threat parameters for infrared Laser direct countermeasure (block 414), the countermeasure waveform may be constructed according to these parameters (block 415). Then, the Laser transmitter may be activated (block 416).

If the threat parameters are updated during the activation of the Laser transmitter (block 417), then an updated countermeasure waveform may be constructed (block 415) and used.

Other suitable operations, or other suitable order of operations, may be used in accordance with the present invention.

Figure 5:
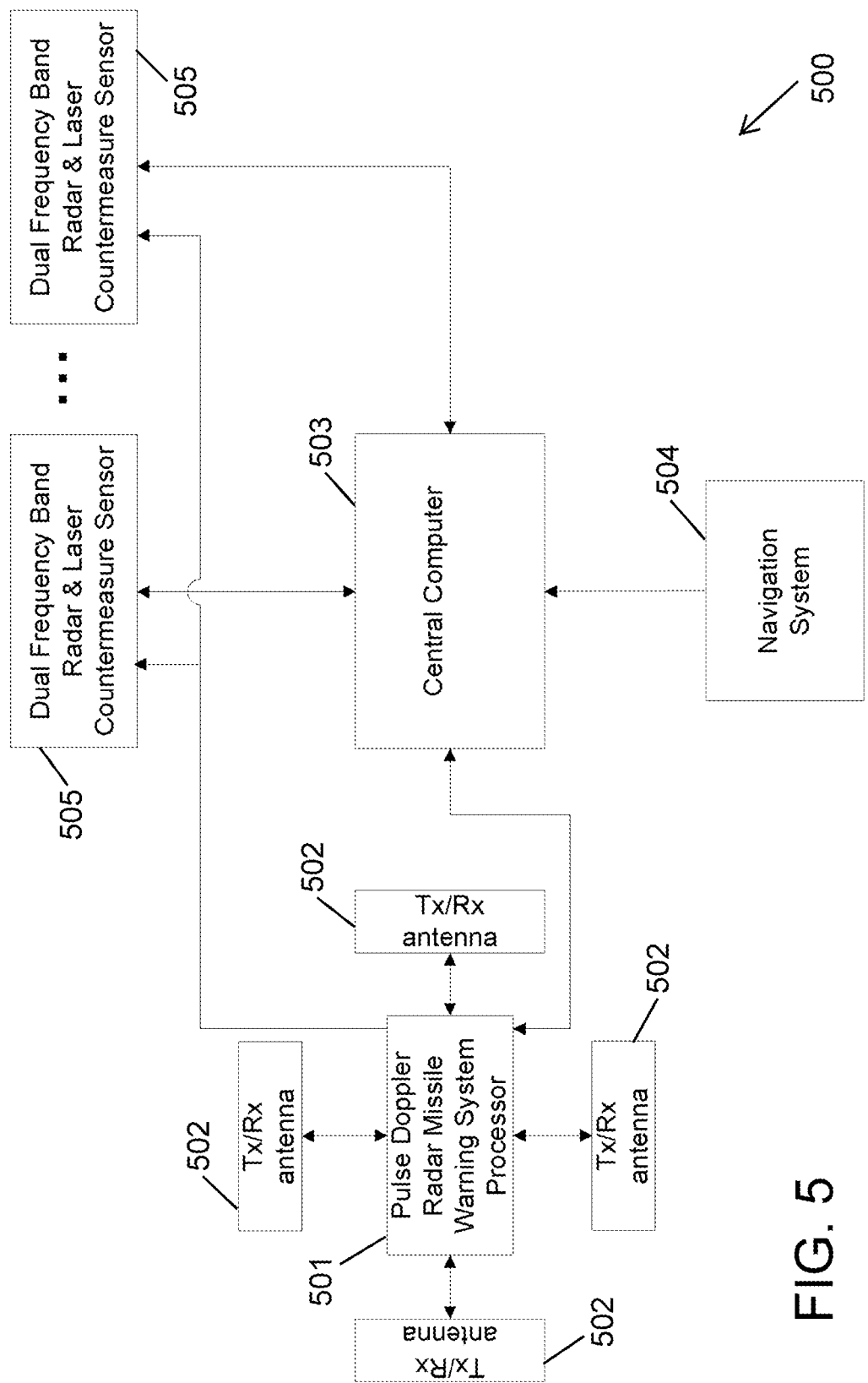
FIG. 5 is a schematic block diagram illustration of an aircraft protection system, in accordance with some demonstrative embodiments of the present invention.

Reference is made to FIG. 5, which is a schematic block diagram illustration of an airborne missile protection system 500, in accordance with some demonstrative embodiments of the present invention. System 500 may comprise a pulse Doppler radar MWS, a central computer, an optional inertial measurement unit, and one or more Dual RF Frequency Band Unified RVS with DIRCM.

The pulse Doppler radar MWS may comprise a pulse Doppler radar MWS processor 501 and one or more Tx/Rx antennas (e.g., four antennas, or other suitable number of antennas).

The pulse Doppler radar MWS may be connected to an optional central computer 503, which may be connected to a navigation system 504 of the aircraft, in order to receive aircraft navigation data for calculation of threat parameters.

The pulse Doppler radar MWS may operate on L frequency band or other frequency band(s) that may be used for operation of such types of radar.

A Dual Frequency Band Radar and Laser Countermeasure 505 may be connected to the optional central computer 503, to receive parameters for threat tracking and confirmation and optional countermeasure, and may further be connected to the pulse Doppler radar MWS processor 501. The number (e.g., two sensors) of the Dual Frequency Band Radar and Laser Countermeasure sensors 505 may vary, and is not limited to two sensors; other suitable number of sensors may be used.

The threat tracking and confirmation and calculation of threat angular position data may be based on passive radar sensing using the low frequency bands, for example, Low- Band; and may be based on active radar sensing using the high frequency bands, for example, Ka-Band. Other suitable frequency bands may be used.

The countermeasure functionality of the Dual Frequency Band Radar and Laser Countermeasure 505 may be based on transmission of the energy on various electro-optic wavelength regions, for example, IR and/or SWIR. Other suitable wavelength regions may be used.

Figure 6:
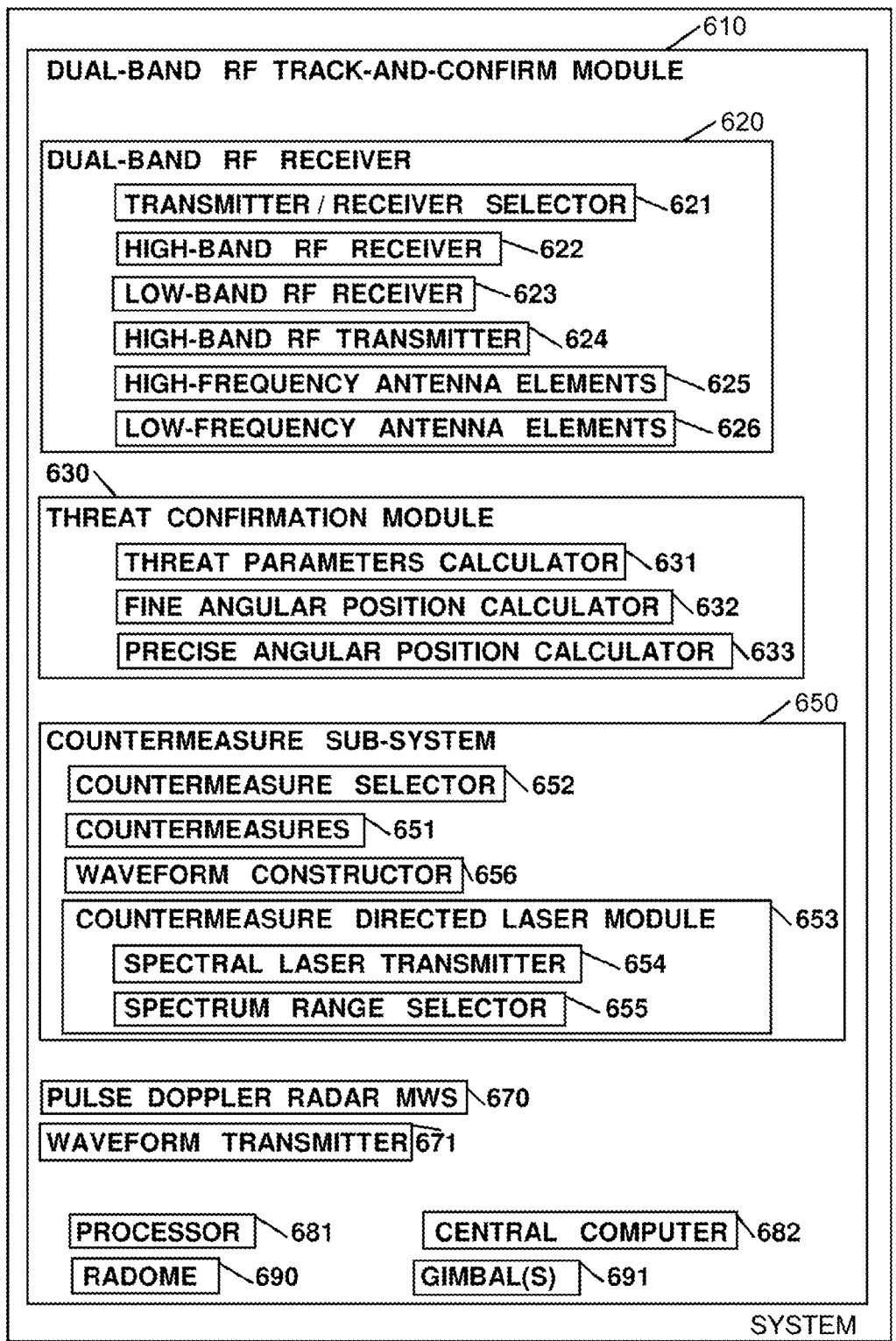
FIG. 6 is a schematic block diagram illustration of a demonstrative implementation of an aircraft protection system and some of its components and modules, in accordance with a demonstrative implementation of the present invention.

Reference is made to FIG. 6, which is a schematic block diagram illustration of a demonstrative implementation of a missile protection system 600, in accordance with some demonstrative embodiments of the present invention. System 600 may be a demonstrative implementation of the present invention, and other suitable implementations may be used.

System 600 may comprise a dual-band Radio Frequency (RF) track-and-confirm module 610, which may comprise: a dual-band RF receiver 620, a threat confirmation module 630, and a countermeasure sub-system 650.

Dual-band RF receiver 620 may comprise, for example, a transmitter/receiver selector 621; a high-band RF receiver sub-unit 622; a low-band RF receiver sub-unit 623; a high-band RF transmitter sub-unit 624; one or more high-frequency (radiating and/or non-radiating) antenna elements 625; and one or more low-frequency (radiating and/or non-radiating) antenna elements 626.

Threat confirmation module 630 may comprise, for example, a threat parameters calculator 631; which may include, for example, a fine angular position calculator 632 and a precise angular position calculator 633.

Countermeasure sub-system 650 may comprise a plurality of countermeasures 651, as well as a countermeasure selector 652. One or more of the countermeasures 651 may comprise, for example, a countermeasure directed Laser module 653, which may comprise a multi-spectral Laser transmitter 654, and a spectrum range selector 655. Optionally, countermeasure sub-system 650 may comprise a countermeasure waveform constructor 656.

In some implementations, system 600 may comprise a pulse Doppler radar Missile Warning System (MWS) 670, which may comprise a waveform transmitter 671. Optionally, a processor 681 and/or a central computer 682 may perform signal processing, unit selection, selective unit activation, selective unit deactivation, data fusion, RF signal(s) processing, or other suitable operations.

Optionally, some or all of the components of system 600 may be housed in, or encapsulated in, a radome 690 (which is depicted as a separate unit in order to keep the drawing clear, even though radome 690 may encapsulates other components). Additionally or alternatively, some or all of the components of system 600 may be mounted on, or slewed by, one or more gimbal mechanisms 691. Other suitable components or modules may be used.

In some demonstrative embodiments of the present invention, the term "low-band frequency" or "low-band" may comprise, for example, a range of spectrum frequency ranging from A-Band (e.g., from 50 MHz) to Ku-Band (e.g., up to 18 GHz); or may comprise L-Band, S-Band, C-Band, X band, and Ku band; or may comprise a range of 50 MHz to 18 GHz; or a range of 1 GHz to 18 GHz; and/or other suitable combination of frequency bands that are smaller than Ka-Band.

In some demonstrative embodiments of the present invention, the term "high-band frequency" or "high-band" may comprise, for example, a range of spectrum frequency corresponding to Ka-Band, or a frequency range of 33 to 38 GHz, or a frequency range of 26.5 to 40 GHz.

In some implementations, one or more components of the system (e.g., the RF module, and parts of the antenna) may utilize low-band, or may utilize high-band, or may utilize both low-band and high-band.

Some implementations of the present invention may be used in conjunction with a Pulse Doppler Radar MWS, and may add a DIRCM unit combined or integrated with such Pulse Doppler Radar MWS, and/or implemented on a unified Line Replacement Unit (LRU). For example, the pulse Doppler radar MWS may comprise a central LRU and multiple antennas. The Tx signal may be created by the LRU, amplified and transmitted to one of the antennas in a round sequence or other suitable sequence or structure. Each antenna covers a sector of approximately 60 to 90 degrees, in Azimuth and Elevation planes. For example, there may be 4 to 6 antennas used in the pulse Doppler radar MWS, and each antenna may be installed in (or mounted on) a different area or section of the aircraft. There may be a small overlap between the coverage of the multiple antennas, for example, in the Azimuth plane. The antennas may be installed over the Azimuth plane of the aircraft, and thus it may be possible to extract a better Azimuth angular location or direction of the threat (e.g., rather than an Elevation angular location or direction of the threat). The signal may be transmitted by the pulse Doppler radar MWS, may be echoed back from the threat, and may be received by the same antenna and transmitted back to the LRU for signal processing. If a threat is detected, then a threat detection signal may be generated, and a chaff-dispenser or flare-dispenser or other omni-countermeasure dispenser(s) may be activated or deployed towards the direction of the detected threat.

In some embodiments, the waveform transmitter in the pulse Doppler radar MWS may be part of the central LRU; and may generate and transmit a waveform in the L-Band frequency range, in the S-Band frequency range, and/or in the C-Band frequency range.

In some embodiments, the dual-band RF receiver may be implemented as a single or combined or unified receiver; or as two separate receivers (e.g., low-band receiver and high-band receiver). In some embodiments, the unified or combined implementation may be more beneficial in terms of parallel performance and/or better accuracy. In some embodiments, the separate implementation may be more compact in terms of physical size and/or weight, and may consume less power.

In some implementations of the present invention, the gimbal (or turret) that has both RF frequency band receivers and the laser, may begin moving or slewing towards the direction of the threat upon or during low-band confirmation attempt, as well as during high-band confirmation attempt; and during the high-band confirmation attempt it may perform the final (or precise) angular "lock" on the incoming threat. In some embodiments, the laser transmitter may be in motion continuously from the initial detection of the possible threat; but may begin to transmit Laser beam(s) only once the precise angular position of the incoming threat is extracted based on the high-band confirmation functionality. In some embodiments, the time gap between the low-band confirmation (and determination of raw/sector direction of the threat) and the high-band confirmation of the threat (and determination of precise direction of the threat), may be a short time frame which may be smaller than one second, or may be smaller than half-a-second, or may be between 1 to 50 milliseconds. The present invention may thus achieve a rapid response time and/or faster deployment of the counter-measure towards the incoming threat.

In some implementations of the present invention, the dual-band receiver may be continuously operative and activated. In other implementations, the dual-band receiver may be continuously non-operational or may be in stand-by mode, and may be fully activated only upon a detection signal from the pulse Doppler radar MWS. In other implementations of the present invention, the high-band receiver of the dual-band RF module may be continuously operational for as long as the low-band receiver of the dual-band RF module is operational; or alternatively, the high-band receiver of the dual-band RF module may be deployed or fully activated only upon threat confirmation by the low-band receiver of the dual-band RF module.

In some embodiments of the present invention, the system may utilize passive (e.g., non-radiating) antenna element(s) for low-band signals, and active (e.g., radiating) antenna element(s) for high-band signals; optionally implemented as a dual-layer antenna structure or antenna array, and optionally implemented by using the same physical component(s), or by sharing at least one or some physical elements for both low-band and high-band signals.

In some embodiments, the antenna elements may be structured as a ring or a frame or a square, or other set of antenna elements, which may surround or encircle the laser transmitter; rather than, for example, placing the antenna elements in one row or in two rows. The suggested structure may allow a more compact size or footprint; and further, since the laser transmitter may be attached to the antenna and RF module structure, and its output may be located at the center of the antenna array or antenna structure, then boresight error(s) (e.g., possibly caused or induced by the radome) between the RF and laser parts in the system may be minimal or close to zero, thereby obviating the need for calibration between RF signals and laser signal, and thereby reducing the complexity and cost of the system and increasing the accuracy and efficiency of the system.

In some embodiments, if the system is capable of classifying the type of threat to a certain degree (for example, by determining or measuring the threat parameters by utilizing the confirmation function of the combined system), then the appropriate Laser band may be selected and used (e.g., by a spectrum range selector module) for "laser jamming" of the incoming threat.

In some implementations, the spectrum range selection for the countermeasure may be based, for example, on the frequency of the low-band receiver function, and/or may take into account data from the MWS being used. The low-frequency range of the spectrum may be selected according to the operating frequency band of the pulse Doppler MWS. The MWS may support different frequency bands, and the selection of the low-band operating frequency may be configured or modified. The high-frequency band may be constant or fixed, and maybe non-modifiable.

In some embodiments of the present invention, the high-band RF transmitter may transmit a high-band signal that can reach, for example, 2 or 5 or 7 kilometers; towards the direction as commanded by the central computer (e.g., based on low-band signal analysis). The slew towards that direction may be performed by the gimbal of the system, and the high-band RF transmitter may be part of the gimbal or may be connected to the gimbal, as described.

In some embodiments, the pulse Doppler radar MWS may provide parameters related to the transmitter waveform, such as Tx frequency, waveform pulse-wave (PW), pulse repetition rate (PRR), pulse repetition frequency (PRF), pulse repetition interval (PRI) or inter-pulse period (IPP), modulation of the above, number of pulses per each integration cycle, coherent and non-coherent integration parameters, threshold levels, and/or other parameters that may be used for implementing low-band confirmation functionality inside or together with the MWS sensor.

Some implementations of the present invention may operate in conjunction with, or may utilize, one or more devices or methods described in United States Patent Application Publication Number 2012/0298748, titled "System, Device, and Method of Protecting Aircrafts Against Incoming Missiles and Threats", which is hereby incorporated by reference in its entirety.

Some implementations of the present invention may operate in conjunction with, or may utilize, one or more devices or methods described in U.S. Pat. No. 8,258,998, titled "Device, System, and Method of Protecting Aircrafts Against Incoming Threats", which is hereby incorporated by reference in its entirety.

Some embodiments of the present invention may be implemented by utilizing any suitable combination of hardware components and/or software modules; as well as other suitable units or sub-units, processors, controllers, DSPs, CPUs, Integrated Circuits, output units, input units, memory units, long-term or short-term storage units, buffers, power source(s), wired communication links, wireless communication links, wired or wireless transceivers, Operating System(s), drivers, software applications, user interface components, or the like.

Functions, operations, components and/or features described herein with reference to one or more embodiments of the present invention, may be combined with, or may be utilized in combination with, one or more other functions, operations, components and/or features described herein with reference to one or more other embodiments of the present invention.

While certain features of the present invention have been illustrated and described herein, many modifications, substitutions, changes, and equivalents may occur to those skilled in the art. Accordingly, the claims are intended to cover all such modifications, substitutions, changes, and equivalents.

What is claimed is:

1. A system for protecting an aircraft against incoming threats, the system comprising:
  (a) a dual-band Radio Frequency (RF) track-and-confirm module comprising:
    a dual-band RF receiver to receive high-band RF signals and low-band RF signals;
    a threat confirmation module to confirm a possible incoming threat based on processing of RF signals received at the dual-band RF receiver;
    a threat parameters calculator to calculate a fine angular position and a precise angular position of a confirmed incoming threat, based on processing of RF signals received at low-band RF for fine angular position and at high-band RF for precise angular position;
  (b) a countermeasure directed laser module to activate a directed laser countermeasure towards said precise angular position of said confirmed incoming threat,
    wherein the system comprises a central processor to select a countermeasure technique, out of a plurality of countermeasures techniques available on said aircraft, based on a data fusion algorithm that fuses data from the dual-band RF track-and-confirm module and one or more of:
    altitude of the aircraft,
    attitude of the aircraft,
    height of the aircraft,
    number of concurrently incoming threats,
    directions of concurrently incoming threats,
    number of protection systems installed on the aircraft,
    angular coverage of protection systems installed on the aircraft, and
    calculated threat parameters.

2. The system of claim 1, wherein the dual-band RF receiver comprises:
a passive low-band receiver sub-unit able to receive incoming low-band RF signals without transmitting any RF waveforms by said dual-band RF track-and-confirm module.

3. The system of claim 2, further comprising:
a pulse Doppler radar Missile Warning System (MWS) comprising a waveform transmitter;
wherein the dual-band RF track-and-confirm module is a passive receiving module that avoids transmitting of waveforms, and that receives a return of the waveform transmitted by said waveform transmitter of said pulse Doppler radar MWS.

4. The system according to claim 1, wherein the dual-band RF receiver comprises:
a high-band RF receiver sub-unit to receive high-band RF signals;
a low-band RF receiver sub-unit to receive low-band RF signals; and
a dual-band receive antenna connected to both said high-band RF receiver sub-unit and said low-band RF receiver sub-unit.

5. The system according to claim 1, wherein the dual-band RF receiver comprises:
a high-band RF receiver sub-unit to receive high-band RF signals;
a low-band RF receiver sub-unit to receive low-band RF signals;
wherein both the high-band RF receiver sub-unit and the low-band RF receiver sub-unit are implemented within a same RF module.

6. The system according to claim 3, wherein the dual-band RF track-and-confirm module comprises:
a spectrum range selector to select a spectrum range in which the dual-band RF track-and-confirm module is to operate, based on (a) one or more threat parameters generated by the threat parameters calculator, and (b) one or more threat parameters generated by the active pulse Doppler MWS.

7. The system according to claim 1, wherein the threat parameters calculator comprises:
a fine angular position calculator to calculate a fine angular position with an error of up to 1 degree, of said confirmed incoming threat, based exclusively on (a) processing of low-band RF signals received at low-band RF, and (b) aircraft real-time navigation data; wherein the fine angular position calculator operates without taking into account RF signals received at high-band RF.

8. The system according to claim 7, wherein the threat parameters calculator comprises:
a precise angular position calculator to calculate a precise angular position of said confirmed incoming threat, based on (a) processing of high-band RF signals received at high-band RF, and (b) aircraft real-time navigation data, and (c) the fine angular position of said confirmed incoming threat as calculated from passive received low-band RF signals.

9. The system according to claim 1, wherein the dual-band RF track-and-confirm module comprises:
a passive low-band RF receiver sub-unit to receive low-band RF signals without transmitting low-band RF signals;
a high-band RF transmitter to transmit high-band RF signals;
a high-band RF receiver sub-unit to receive high-band RF signals.

10. The system according to claim 9, wherein the dual-band RF track-and-confirm module comprises:
a transmitter/receiver selector (a) to selectively activate and deactivate the passive low-band RF receiver sub-unit, and (b) to selectively activate and deactivate the high-band RF receiver sub-unit, and (c) to selectively activate and deactivate the high-band RF transmitter sub-unit.

11. The system according to claim 10, wherein the transmitter/receiver selector is to selectively activate the high-band RF transmitter and the high-band RF receiver, based on processing of low-band RF signals received at previously-activated said passive low-band RF receiver sub-unit.

12. The system according to claim 1, further comprising:
a countermeasure selector to select a countermeasure for activation against the confirmed incoming threat, out of a plurality of countermeasures available on said aircraft, based on RF signals received at the high-band RF.

13. The system according to claim 1, further comprising:
a gimbal mechanism comprising a dual-axis steering gimbal, to slew towards the confirmed incoming threat (a) the dual-band RF track-and-confirm module, (b) the countermeasure directed laser module, and (c) a dual-band antenna associated with the dual-band RF track-and-confirm module.

14. The system according to claim 1, wherein the countermeasure directed laser module comprises a multi-spectral laser transmitter to transmit multi-spectral laser transmission towards the confirmed incoming threat.

15. The system according to claim 1, wherein both the countermeasure directed laser module and the dual-band RF track-and-confirm module are mounted on, and slewed by, a same gimbal mechanism.

16. The system according to claim 3, wherein the threat parameters calculator of the dual-band RF track-and-confirm module takes into account, and optimizes signal processing by using, real-time radar information obtained from the pulse Doppler radar MWS.

17. The system of claim 1, wherein the dual-band RF track-and-confirm module performs threat tracking and threat confirmation on both low-band RF and high-band RF by utilizing a pulse Doppler radar technique.

18. The system of claim 1, further comprising:
a countermeasure waveform constructor to construct a waveform of a countermeasure based on threat parameters calculated by taking into account both incoming low-band RF signals and incoming high-band RF signals.

19. The system of claim 1, further comprising:
a radome to encapsulate the dual-band RF track-and-confirm module and the countermeasure directed laser module;
wherein the radome enables transmission through the radome of (a) electromagnetic signals on low-band RF, and (b) electromagnetic signals on high-band RF, and (c) optical signals.

20. The system of claim 1, further comprising:
a radome to encapsulate the dual-band RF track-and-confirm module and the countermeasure directed laser module;
wherein the radome enables transmission through the radome of (a) electromagnetic signals on low-band RF, and (b) electromagnetic signals on high-band RF, and (c) laser signals.

21. The system of claim 1, wherein the dual-band RF receiver comprises a plurality of antenna elements to receive low-band RF signals and high-band RF signals;

wherein at least some of the plurality of antenna elements form a circle around said countermeasure directed laser module.

22. The system of claim 1, wherein the dual-band RF receiver comprises a plurality of radiating elements to receive low-band RF signals and high-band RF signals;
wherein all of the plurality of antenna elements surround said countermeasure directed laser module.

23. The system of claim 1, wherein the dual-band RF receiver comprises a plurality of antenna elements to receive low-band RF signals and high-band RF signals;
wherein the plurality of antenna elements are divided into four regions.

24. The system of claim 1, wherein the dual-band RF receiver comprises a plurality of antenna elements to receive low-band RF signals and high-band RF signals;
wherein the plurality of antenna elements are divided into four regions;
wherein RF signals received by the plurality of antenna elements are processed using Sigma/Delta mono-pulse tracking.

25. The system of claim 1, wherein the dual-band RF receiver comprises a plurality of antenna elements to receive low-band RF signals and high-band RF signals;
wherein the plurality of antenna elements are divided into four regions;
wherein RF signals received by the plurality of antenna elements are processed using phase tracking.

26. The system of claim 1, wherein the dual-band RF receiver comprises a plurality of antenna elements to receive low-band RF signals and high-band RF signals;
wherein the plurality of antenna elements are divided into four regions;
wherein each region of said four regions comprises a single low-frequency radiating element inter-connected with a plurality of high-frequency radiating elements.

* * * * *